Patented May 29, 1923.

1,456,924

UNITED STATES PATENT OFFICE.

PIERRE E. HAYNES, OF BUFFALO, AND GEORGE P. GERFIN, OF NIAGARA FALLS, NEW YORK, ASSIGNORS TO THE LINDE AIR PRODUCTS COMPANY, A CORPORATION OF OHIO.

PLASTER AND PROCESS OF MAKING THE SAME.

No Drawing. Application filed April 29, 1921. Serial No. 465,480.

*To all whom it may concern:*

Be it known that we, PIERRE E. HAYNES and GEORGE P. GERFIN, citizens of the United States, residing at Buffalo and Niagara Falls, respectively, in the counties of Erie and Niagara and State of New York, have invented certain new and useful Improvements in Plaster and Processes of Making the Same, of which the following is a specification.

Our invention relates to compositions suitable for making plaster-board and for other purposes for which plaster is employed, and to processes for making such compositions. More specifically, our invention relates to the production of plaster from lime sludges which are by-products of certain industries. The object of our invention is to produce a plaster having valuable properties, and to utilize by-products which are now in many cases worse than worthless since their disposal involves large expense.

As an example of the sludges referred to above, the residue left on the decomposition of calcium carbide to produce acetylene may be mentioned. It is well-known that this residue consists chiefly of slaked lime ($Ca(OH)_2$) and water, but the quantity of water present is usually so high that the cost of dehydrating the sludge for the recovery of its lime would be prohibitive. In the standard procedure for producing acetylene from calcium carbide on the large scale, the residue contains approximately 88% of water.

As an example of the manner in which our invention is practised, a process which gives good results will be described: Sludge of the composition indicated above is treated for the removal of a portion of its water in an apparatus such as a Dorr or Genter thickener, where it is concentrated until it contains 40–50% of solid matter. The thickened sludge is then mixed in any suitable apparatus with a pulverulent water-absorbing material having cementitious properties supplementing those of the lime. Ground coal ashes are well suited for this purpose but ground slag from metallurgical operations also give good results. Within rather wide limits in the proportion of water-absorbent to thickened sludge, a plaster is formed of suitable consistency and having desirable qualities on setting. Very good results have been obtained where the ratio of thickened sludge to ground ashes varied from 1:1 to 4:1. If a sludge of low water content is available, thickening may be dispensed with.

In some cases, it is desirable to add to the plaster small amounts of other substances to modify its properties. For example, up to 5% of asbestos may be added and other fibrous materials may likewise be used. Silicate of soda in suitable quantity, for example 3%, increases the strength of the plaster after setting and may also be added to the mixture. In general, however, the final product is cheapest and best when the quantity of materials other than sludge and pulverulent water-absorbent is kept low.

While plaster formed in the above manner is suitable for all uses to which plaster is applied, it is especially adapted to the manufacture of plaster-board. Processes for making such board and machines for the purpose are widely known and used and our plaster may be substituted for the gypsum plaster now generally employed with little or no change in procedure except the allowance of a considerable period for the plaster to take its initial set. Excellent results have been obtained with our plaster by air-drying the freshly-formed board for 18 to 20 hours and then drying with free circulation of air for 24 to 30 hours at about 100° C. The board is then preferably stored for about ten days for seasoning before it is shipped.

We claim:

1. The process of treating lime sludge containing lime as the principal non-aqueous ingredient which comprises mixing it with a water-absorbing cementitious material in such proportions that a mixture of plaster-like consistency is formed.

2. The process of treating lime sludge containing lime as the principal non-aqueous ingredient which comprises mixing it with coal ashes in such proportions that a mixture of plaster-like consistency is formed.

3. The process of treating lime sludge which comprises thickening the sludge, mixing it with a water-absorbing cementitious material, and regulating the degree of thickening and the quantity of water-absorbing material used so that a mixture of plaster-like consistency is formed.

4. The process of treating lime sludge which comprises thickening the sludge, mixing it with coal ashes and regulating the degree of thickening and the quantity of ashes used so that a mixture of plaster-like consistency is formed.

5. A composition of plaster-like consistency comprising a pulverulent water-absorbing cementitious material and lime sludge containing lime as the principal non-aqueous ingredient.

6. A composition of plaster-like consistency comprising coal ashes and at least an equal weight of lime sludge.

7. A hardened sensibly dry plaster such as may be formed by the setting of a mixture consisting essentially of ground coal ashes and at least an equal weight of lime sludge.

In testimony whereof, we affix our signatures.

GEORGE P. GERFIN.
PIERRE E. HAYNES.